(12) United States Patent
Zell

(10) Patent No.: US 11,897,071 B2
(45) Date of Patent: Feb. 13, 2024

(54) GRID-TYPE WORKPIECE CARRIER

(71) Applicant: Zell Systemtechnik GmbH, Ehingen (DE)

(72) Inventor: Ingo Zell, Ehingen (DE)

(73) Assignee: Zell Systemtechnik GmbH, Ehingen (DE)

( * ) Notice: Subject to any disclaimer, the term of this patent is extended or adjusted under 35 U.S.C. 154(b) by 187 days.

(21) Appl. No.: 17/604,019

(22) PCT Filed: Apr. 15, 2020

(86) PCT No.: PCT/EP2020/060538
§ 371 (c)(1),
(2) Date: Jan. 26, 2022

(87) PCT Pub. No.: WO2020/212392
PCT Pub. Date: Oct. 22, 2020

(65) Prior Publication Data
US 2022/0219270 A1    Jul. 14, 2022

(30) Foreign Application Priority Data

Apr. 18, 2019 (DE) .................... 20 2019 102 247.7

(51) Int. Cl.
*B23Q 3/10* (2006.01)

(52) U.S. Cl.
CPC ............. *B23Q 3/102* (2013.01); *B23Q 3/103* (2013.01)

(58) Field of Classification Search
CPC .... B23K 37/0443; B23Q 3/061; B25H 3/003; B25H 3/06; C21D 9/0025; F27D 5/0006; F27D 5/0037; F27D 5/0043; F27D 5/005; H01L 21/6732; H01L 21/67333; H01L 21/67356; H01L 21/68771; H01L 21/68778

See application file for complete search history.

(56) References Cited

U.S. PATENT DOCUMENTS

| | | | |
|---|---|---|---|
| 4,556,776 A | * | 12/1985 | Duncan .............. B23K 37/0443 976/DIG. 81 |
| 8,708,295 B2 | | 4/2014 | Barthelmie et al. |
| 2003/0180677 A1 | | 9/2003 | Akiyama et al. |

FOREIGN PATENT DOCUMENTS

| | | |
|---|---|---|
| DE | 10 2009 037 293 A1 | 3/2011 |
| DE | 20 2013 011 806 U1 | 7/2014 |

OTHER PUBLICATIONS

International Search Report in PCT/EP2020/060538, dated May 28, 2020.

\* cited by examiner

*Primary Examiner* — Tyrone V Hall, Jr.
(74) *Attorney, Agent, or Firm* — Collard & Roe, P.C.

(57) ABSTRACT

A grid-type workpiece carrier includes parallel strip-type first grid elements having recesses, and strip-type second grid elements arranged transverse to the first grid elements and having recesses, wherein the recesses of the first and second grid elements engage in one another in such a way that the crossing first and second grid elements form a grid, wherein the first grid elements are mechanically securely fixed to second grid elements that are arranged in an edge region on opposing sides of the grid.

10 Claims, 4 Drawing Sheets

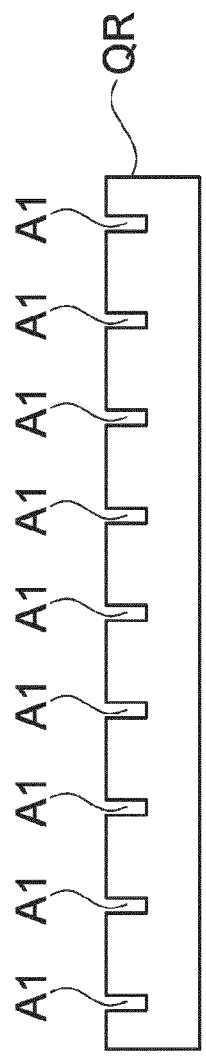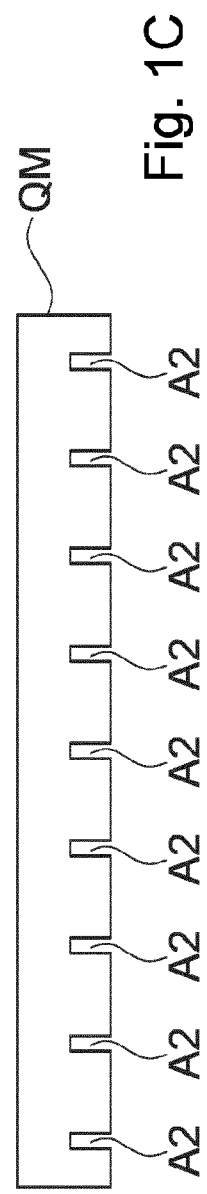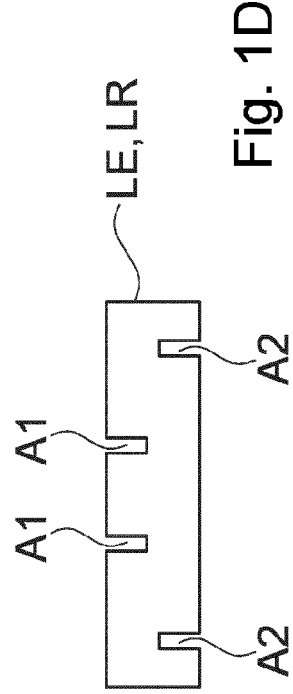

GRID-TYPE WORKPIECE CARRIER

CROSS REFERENCE TO RELATED APPLICATIONS

This application is the National Stage of PCT/EP2020/060538 filed on Apr. 15, 2020, which claims priority under 35 U.S.C. § 119 of German Application No. 20 2019 102 247.7 on Apr. 18, 2019, the disclosure of which is incorporated by reference. The international application under PCT article 21(2) was not published in English.

The invention relates to a grid-type workpiece carrier having grid elements that intersect one another and have notches engaging in one another so that they form a grid.

Workpiece carriers are used to prepare and retain one or more workpieces in order to process them in a fabrication station. As examples, the processing may comprise hardening, cleaning, transport, heat treatment or sintering. One simple embodiment of a workpiece carrier is a substantially rectangular plate having supports and/or retainers for one or more workpieces.

A grid-type workpiece carrier, as shown in DE 10 2009 037 293 A1 for example, is stable, material-saving and weight-saving, and permits access to the workpiece from several sides. Such a grid-type workpiece carrier may be made from plank-like carbon or ceramic grid elements that engage in one another.

The stated task is to provide an alternative grid-type workpiece carrier.

The task is accomplished by a workpiece carrier having the features of claim 1.

The grid-type workpiece carrier comprises a multiplicity of plank-like first grid elements disposed in parallel and having notches, and a multiplicity of plank-like second grid elements disposed transversely thereto and having notches. The notches of the first and second grid elements have the form of slits, for example, and engage in one another in such a way that the first and second grid elements intersecting one another form a grid. A mechanically secure fixation of the first grid elements takes place only at some of the second grid elements disposed transversely to them. These second grid elements, on which the first grid elements are mechanically securely fixed, are located on opposite sides of the grid in a peripheral region of the grid.

In other words: The second grid elements beyond the peripheral region do not have to be joined mechanically securely to the first grid elements, but instead are retained in their place by the first grid elements engaging from above and below. The second grid elements beyond the peripheral region have, both on the upper side and on the underside of the grid, notches in which the intersecting first grid elements engage and thus retain the second grid elements in their position.

In such a grid, the first grid elements may be disposed in longitudinal (long) direction and the second grid elements in transverse (cross) direction or vice versa relative to them.

The workpiece carrier may be used for various fabrication steps, such as hardening, cleaning and transport.

Advantageously, the second grid elements on which the first grid elements are fixed mechanically securely are the outer grid elements on opposite sides of the grid. This permits a simple fixation on the readily accessible outer sides of the grid.

In one embodiment, the first and second grid elements are metals, which permits their simple fabrication as well as the formation of a stable grid and welding as the fixation technique. Steel, which permits the use of the workpiece carrier at up to 1200 degrees Celsius, for example, may be considered as the metal.

Furthermore, due to the use of this material, the workpiece carrier is resistant to emulsions and oils. Since steel can be easily machined, the workpiece carrier can be adapted in simple manner to various workpieces. A workpiece carrier adapted to the needs may be made in simple manner from prefabricated grid elements.

The mechanically secure fixation is a fixation of points of intersection of grid elements engaging in one another together with use of a fixation means, which extends beyond the mere engagement of the grid elements in one another. In one embodiment, the mechanically secure fixation is a substance-to-substance bond; for example, the mechanically secure fixation may be a welded joint, especially a spot-welded joint, or an adhesive bond. These fixation systems are stable and easy to make. In one embodiment, a substance-to-substance bond is used as the mechanically secure fixation only of one part of the first grid elements.

At least one part of the first and of the second grid elements has, on a side turned toward their grid upper side, workpiece support areas, which retain the workpiece or workpieces.

The workpiece support areas may be designed as raised or recessed portions on the grid upper side of the first or second grid elements, in order thereby to permit the supporting of the workpiece in a suitable position.

In one embodiment, the notches are disposed in comb-like manner either in the first or in the second grid elements. "Comb-like" means that all notches are disposed either on the upper side of the grid element or on the underside of the grid element. The upper side of the grid element is turned toward the grid upper side. The underside of the grid element is turned toward the grid underside. It is to be noted that, in the case of comb-like first grid elements, both first grid elements having their notches on the upper side and first grid elements having their notches on the underside are possible. The second grid elements then have notches both on upper side and underside. The reverse is the case for comb-like second grid elements.

In one embodiment, the second grid elements beyond the peripheral region are joined interlockingly without play to the first grid elements. This permits a good fit and a joint that possibly is additionally interlocking. Alternatively, the second grid elements beyond the peripheral region are joined interlockingly with play with the first grid elements, so that mechanical or thermal stress may be absorbed.

Further advantageous embodiments will become apparent from the dependent claims.

The invention will be explained in more detail in the following on the basis of exemplary embodiments in the drawings.

FIG. 1A schematically shows an exemplary embodiment of a grid-type workpiece carrier in a plan view.

In the figures, like or functionally like-acting component parts are denoted with the same reference symbols.

Figure 1A:
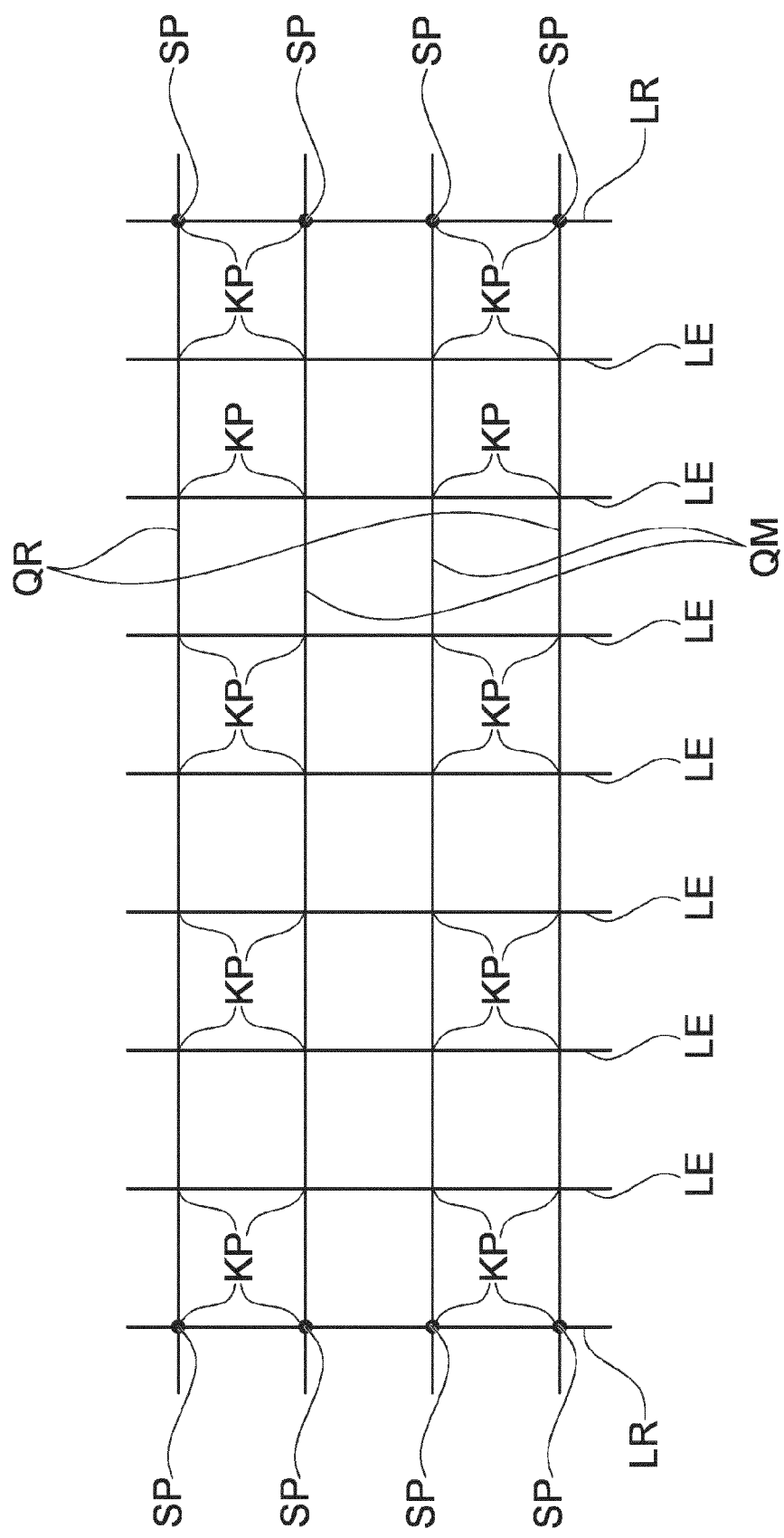
FIGS. 1B, 1C, 1D show exemplary embodiments of plank-like grid elements of the workpiece carrier illustrated in FIG. 1A in a side view.

FIG. 1A schematically shows an exemplary embodiment of a grid-type workpiece carrier in a plan view.

The workpiece carrier comprises a multiplicity of longitudinally disposed plank-like grid elements LE, LR as well as, disposed transversely relative to them, a multiplicity of plank-like grid elements QR, QM. The longitudinally and transversely disposed grid elements QR, QM, LE, LR intersecting one another form a grid.

FIGS. 1B, 1C, 1D show the plank-like grid elements QR, QM, LE, LR illustrated in FIG. 1A in the side view. The plank-like grid elements QR, QM, LE, LR are strap-shaped or strip-shaped. They are indeed cuboid, but have very small width in comparison with height and length. Their height is smaller than their length. The grid elements QR, QM, LE, LR are metal, preferably of steel.

The grid comprises several plank-like grid elements LE, LR disposed parallel to one another in longitudinal direction. Perpendicular to them, several grid elements QR, QM disposed in transverse direction extend in a manner disposed in parallel. The outer longitudinally disposed grid elements LR are in a peripheral region that includes these two grid elements LR. Asymmetrically disposed grid elements are also conceivable.

The longitudinally and transversely disposed grid elements QR, QM, LE have notches A1, A2, which engage in one another at points of intersection KP of the grid elements QR, QM, LE. The grid elements QR, QM, LE, LR in this exemplary embodiment have a rectangular basic shape, such that the contour of the side view deviates from the rectangular shape only at the notches A1, A2.

The outer transversely disposed grid elements QR have only notches A1 on an upper side of the grid, and so they have a comb-like contour line in the side view. The grid elements QM disposed transversely between them have notches A2 only on an underside of the grid. The outer notches A2 of the longitudinally disposed grid elements LE, LR are disposed on the underside and the notches A1 situated between them are disposed on the upper side.

The notches A1, A2 of the longitudinally disposed grid elements LE, LR are disposed in a manner corresponding to the transversely disposed grid elements QR, QM, and so, at the points of intersection KP of the grid, a notch A1 on the upper side of a grid element QR, LE, LR engages in a notch A2 on the underside of the intersecting grid element QM, LE, LR and vice versa. The width of the notch A1, A2 corresponds substantially to the width of the embraced grid element QR, QM, LE, LR. The sum of the heights of two notches A1, A2 engaging in one another corresponds substantially to the height of the grid elements QM, QR, LE. Although longitudinally and transversely disposed grid elements QM, QR, LE, LR engage in one another substantially interlockingly, the joints may nevertheless have play. This is a fabrication-related and use-related freedom of movement, in which the grid elements QM, QR, LE, LR are allowed to move relative to one another during or after assembly. Play at the points of intersection KP is able to absorb thermal or mechanical stress that acts on the grid.

For fixation of the grid, the transversely disposed grid elements QR, QM are mechanically securely fixed on the outer longitudinally disposed grid elements LR in the peripheral region. The fixation joint SP is advantageously a substance-to-substance bond, for example, a welded joint, or an adhesive bond. A joint in the form of spot welds is compatible with a simple manufacture and a robust, secure joint.

A mechanically secure joint exists only between the transversely disposed grid elements QR, QM and the outer longitudinally disposed grid elements LR in the peripheral region. The grid elements LR, QM, QR fixed mechanically securely in such a manner have a ladder-like structure. The grid elements LE disposed longitudinally beyond the peripheral region are joined by interlocking with the transversely disposed grid elements QR, QM, which engage in the notches A1, A2 on the upper side and underside of the grid elements LE. Because of the engagements on upper side and underside of the grid elements LE, a joint in addition to this is not necessary to retain the grid elements LE beyond the peripheral region in their position.

It is to be noted that, in the case of longitudinally and transversely disposed grid elements QR, QM, LM engaging in one another without play, the interlocking joint at the points of intersection KP beyond the peripheral region may be additionally accompanied by a frictional connection.

In one alternative exemplary embodiment, the fixation of the transversely disposed grid elements QR, QM may take place at more than or other than the longitudinally disposed outer grid elements LR. The boundary region would then be correspondingly broader.

The mechanically secure fixation only on longitudinally disposed grid elements LR in the peripheral region permits the formation of a stable grid with reduced complexity. Furthermore, the exclusive fixation in the peripheral region has the advantage that, in case of mechanical or thermal stress, a relative motion on the basis of the play at the points of intersection KP of the longitudinally and transversely disposed plank-like grid elements LE, QM, QR is possible, which prevents a deformation of the entire grid during its use as workpiece carrier in the fabrication.

Figure 2:
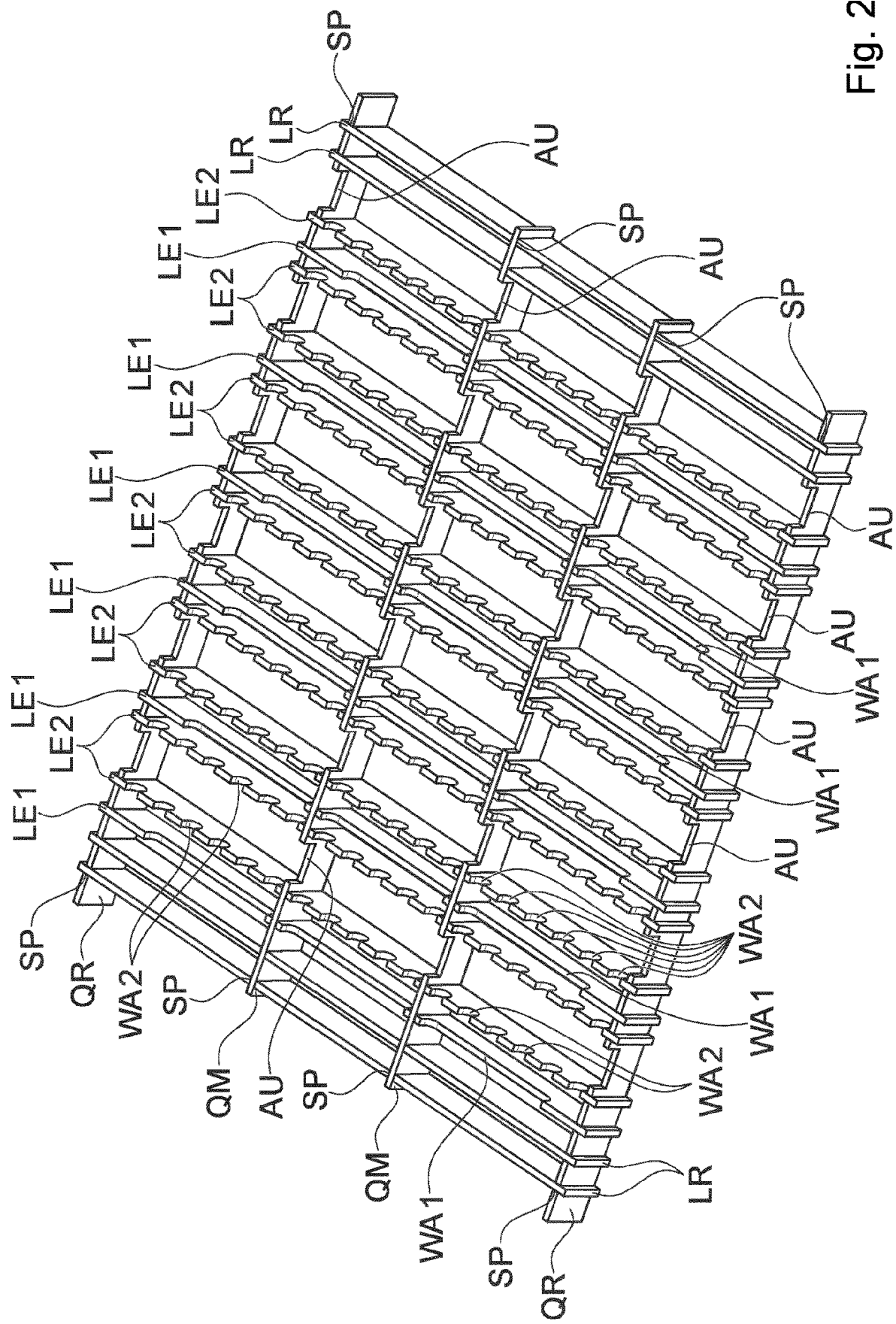
FIG. 2 shows a further exemplary embodiment of a grid-type workpiece carrier.

FIG. 2 shows a further exemplary embodiment of a grid-type workpiece carrier. It has a multiplicity of longitudinally disposed plank-like grid elements LR, LE1, LE2. Furthermore, four transversely disposed grid elements QR, QM are provided. The longitudinally and transversely disposed grid elements LR, LE1, LE2, QR, QM intersect and thus form a grid.

In the peripheral region, two longitudinally disposed grid elements LR having rectangular basic shape are provided respectively on opposite sides. First longitudinally disposed grid elements LE1 and second longitudinally disposed grid elements LE2 are provided in the region between them. The first longitudinally disposed grid elements LE1 have workpiece support regions WA1. The workpiece support region WA1 is designed as an elongated recess on the upper side and it extends between two adjacent transversely disposed grid elements QR, QM. The second longitudinally disposed grid elements LE2 have, between adjacent transversely disposed grid elements QR, QM, a multiplicity of semicircular recessed portions on the upper side, which likewise function as workpiece support regions WA2.

A first followed by a second grid element LE1, LE2 is disposed longitudinally adjacent to the longitudinally disposed grid elements LR in the left peripheral region. The grid elements LE1, LE2 longitudinally disposed between them are disposed in groups, each comprising three grid elements LE2, LE1, LE2. A group comprises a sequence of a second, a first and a second grid element LE2, LE1, LE2. The distance between the groups is larger than the distance between the individual grid elements LE2, LE1, LE2 of the group. The arrangement and shape of the workpiece support regions WA1, WA2 together with the grouping permits a workpiece support and secure retention for several workpieces.

The longitudinally disposed grid elements LR, LE1, LE2 have outer slit-like notches on the underside and two slit-like notches between them on the upper side. The notches engage in corresponding notches of the transversely disposed grid elements QR, QM.

The transversely disposed outer grid elements QR and the transversely disposed grid elements QM between them differ in their shape only in that the outer grid elements QR project somewhat further beyond the outer longitudinally disposed grid elements LR. The outer transversely disposed grid elements QR have slit-like recesses only on the upper side. The transversely disposed grid elements QM situated between them have slit-like notches only on the underside. Between the notches for the groups of longitudinally disposed grid elements LE1, LE2, recessed portions AU are provided on the upper side of the transversely disposed grid elements QR, QM. Mechanically secure fixations SP are provided between the transversely disposed grid elements QR, QM and the outer longitudinally disposed grid elements LR. In an alternative embodiment, mechanically secure joints SP may also be provided on alternative or further longitudinally disposed grid elements LR in the peripheral region. In this exemplary embodiment, the joints SP are spot welds.

Figure 3:
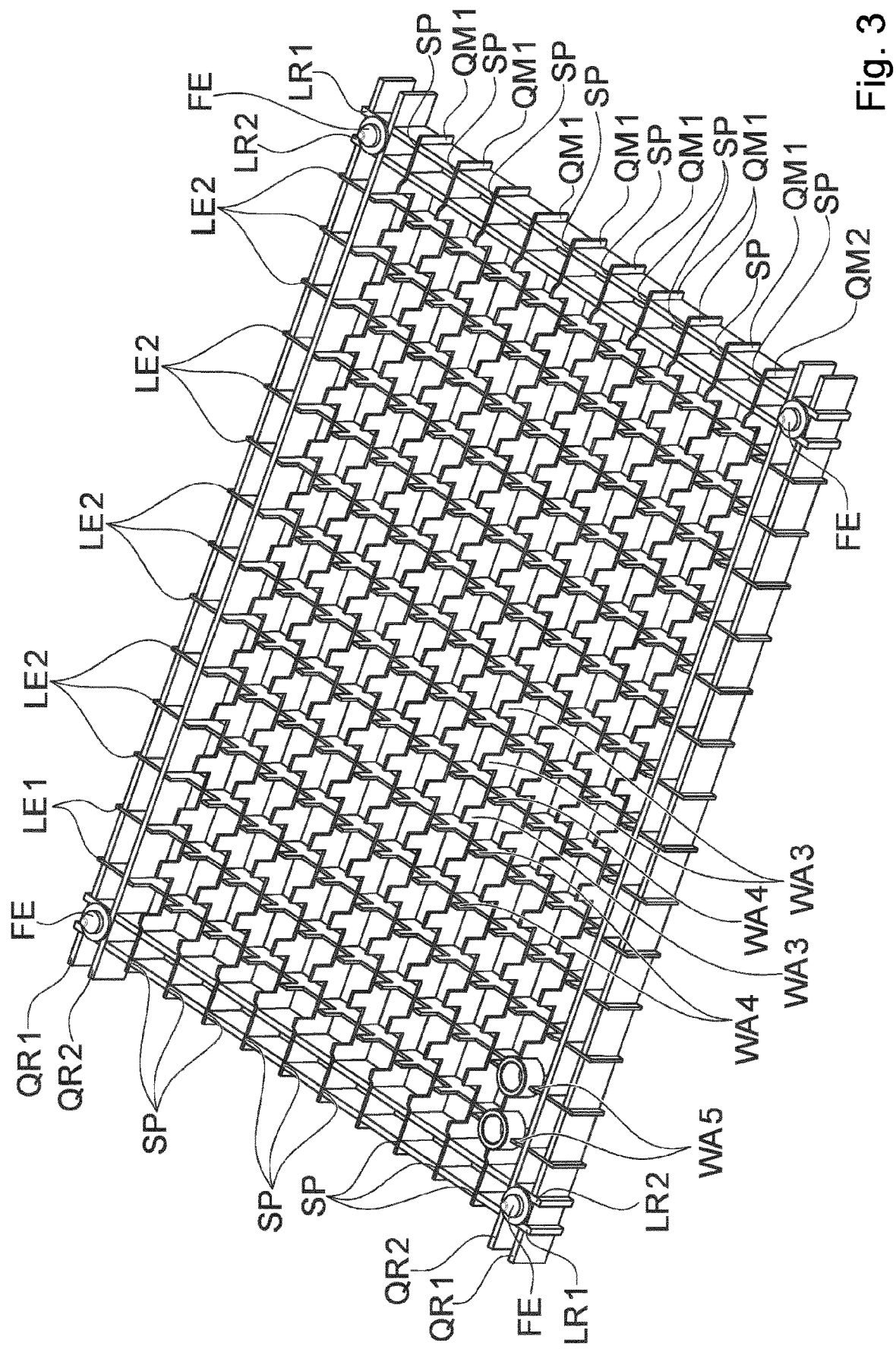
FIG. 3 shows a further exemplary embodiment of a grid-type workpiece carrier.

FIG. 3 shows a further exemplary embodiment of a grid-type workpiece carrier having a multiplicity of longitudinally disposed grid elements LR1, LR2, LE1, LE2 and intersecting transversely disposed grid elements QR1, QR2, QM1, QM2, which form a grid.

In the peripheral region, two longitudinally disposed plank-like grid elements LR1, LR2 are provided respectively on opposite sides. Respectively two transversely disposed plank-like grid elements QR1, QR2 are provided at the periphery. The outer transversely disposed grid elements QR1 have notches only on the upper side. The transversely disposed, peripheral grid elements QR2 adjacent to them have notches only on the underside. This is also the case for the transversely extending grid elements QM1 and QM2 disposed between them.

The longitudinally disposed grid elements LR1, LR2, LE1, LE2 are respectively provided on the outside with one notch disposed above and between these with notches disposed below.

Both the two adjacent outer transversely disposed grid elements QR1, QR2 and the two adjacent outer longitudinally disposed grid elements LR1, LR2 are fastened at corner points of the grid with fixation elements FE in such a way that respectively the two outer intersecting grid elements QR1, QR2, LR1, LR2 are joined to one another. Such a fixation element FE may be disposed as a screw or rivet in a corner quadrant of the grid. Alternatively, a welded joint may be provided.

The transversely disposed grid elements QM1, QM2 between the two adjacent outer transversely disposed grid elements QR1, QR2 are mechanically securely fixed, for example by spot welds SP, on the outer longitudinally disposed grid elements LR1 in the peripheral region. Alternatively, other joints, preferably substance-to-substance bonds are conceivable. The fixation may alternatively take place at other or further longitudinally disposed grid elements LR2 in the peripheral region.

Although the longitudinally disposed grid elements LE1, LE2 beyond the peripheral region are not fixed mechanically securely to the transversely disposed grid elements QR1, QR2, they are retained in the grid, whether with or without play, by virtue of their interlocking joints. The interlocking joint is achieved by the interaction of the transversely extending grid elements QR2, which engage from above and are adjacent to the outer transversely disposed grid elements QR1, and the other transversely disposed grid elements QR1, QM1, QM2, which engage from below.

Beyond the peripheral region, the grid elements QM1, QM2, LE1, LE2 in the region of intersection of the notches engaging in one another are lowered, so that workpiece support regions WA3, WA4 are formed by upwardly projecting rectangular raised portions between them. The width of the raised portions differs for longitudinally and transversely extending raised portions.

A further embodiment of workpiece support regions WA5 is shown in the lower left grid region. Sleeve-like retainers, into which the workpiece or a workpiece retainer (not illustrated in FIG. 3), which may be forked, for example, may be inserted, are introduced into the lowered portions of the points of intersection of the grid elements LE1, QM2.

It is to be noted that the designations "longitudinally" and "transversely" used above are derived from the orientation of the diagram in FIGS. 1A, 2 and 3. In an alternative representation, the grid element may be rotated by 90 degrees, so that "longitudinally" and "transversely" would be interchanged. More generally, and in an alternative phrasing, "longitudinally" corresponds to a first direction and "transversely" to a direction perpendicular or almost perpendicular to it.

The features indicated in the forgoing and those indicated in the claims as well as those that can be inferred from the figures can be advantageously combined and implemented both individually and in various combinations. The invention is not restricted to the described exemplary embodiments but instead may be modified in quite a few ways within the scope of the abilities of persons skilled in the art.

The invention claimed is:

1. A grid-type workpiece carrier having
a multiplicity of plank-like first grid elements (QM, QR, QR1, QR2, QM1, QM2), disposed in parallel and having notches (A1, A2), and a multiplicity of plank-like second grid elements (LE, LR, LE1, LE2, LR1, LR2), disposed transversely thereto and having notches (A1, A2), wherein the notches of the first and second grid elements engage in one another in such a way that the first and second grid elements intersecting one another form a grid,
wherein the first grid elements are mechanically securely fixed only on second grid elements (LR, LR1, LR2) that, out of the multiplicity of second grid elements, are disposed in a peripheral region on opposite sides of the grid, wherein the mechanically secure fixation is a substance-to-substance bond.

2. The grid-type workpiece carrier according to claim 1, wherein the second grid elements out of the multiplicity of second grid elements that are disposed in the peripheral region includes two outer second grid elements disposed on opposite sides of the grid.

3. The grid-type workpiece carrier according to claim 1, wherein the first and second grid elements are metal.

4. The grid-type workpiece carrier according to claim 3, wherein the first and second grid elements are fabricated from steel.

5. The grid-type workpiece carrier according to claim 1, wherein the mechanically secure fixation is a welded joint, especially a spot-welded joint, or an adhesive bond.

6. The grid-type workpiece carrier according to claim 1, wherein at least one part of the first and of the second grid elements comprises, on its side turned toward a grid upper side, workpiece support regions (WA1, WA2, WA3).

7. The grid-type workpiece carrier according to claim 6, wherein the workpiece support regions are designed as raised or recessed portions of the first or second grid elements on the grid upper side.

8. The grid-type workpiece carrier according to claim 1, wherein the notches are disposed in comb-like manner either in the first or in the second grid elements.

9. The grid-type workpiece carrier according to claim 1, wherein the second grid elements beyond the peripheral region have notches on both sides.

10. The grid-type workpiece carrier according to claim 9, wherein the second grid elements beyond the peripheral region are joined interlockingly without play with the first grid elements
    or wherein the second grid elements beyond the peripheral region are joined interlockingly with play with the first grid elements.

\* \* \* \* \*